United States Patent [19]

Nishikawa

[11] 4,189,225
[45] Feb. 19, 1980

[54] ELECTROPHOTOGRAPHIC APPARATUS

[75] Inventor: Masaji Nishikawa, Hachioji, Japan

[73] Assignee: Olympus Optical Co., Ltd., Tokyo, Japan

[21] Appl. No.: 905,037

[22] Filed: May 9, 1978

[30] Foreign Application Priority Data

May 11, 1977 [JP] Japan .................................. 52-53228

[51] Int. Cl.² ...................... G03G 15/28; G03B 27/48
[52] U.S. Cl. .......................................... 355/8; 355/51
[58] Field of Search ......................... 355/72, 75, 57, 58, 355/66, 60, 50, 51, 3 CH, 3 SH, 8, 11, 3 R

[56] References Cited

U.S. PATENT DOCUMENTS 3,437,408  4/1969  Kazan .................................. 355/3 R
3,493,299  2/1970  Hazelton .............................. 355/11
3,877,807  4/1975  Kurita .................................. 355/66

FOREIGN PATENT DOCUMENTS 51-101538  9/1976  Japan ........................................... 355/8

Primary Examiner—Donald A. Griffin
Attorney, Agent, or Firm—Haseltine, Lake & Waters

[57] ABSTRACT

An electrophotographic apparatus for exposing and scanning a document placed on a fixed copy board by a scanning optical system. A sheet feed device is provided near the fixed copy board for feeding and exposing a sheet-like document. The optical system corresponding to the sheet feed device comprises at least a part of the scanning optical system.

9 Claims, 3 Drawing Figures

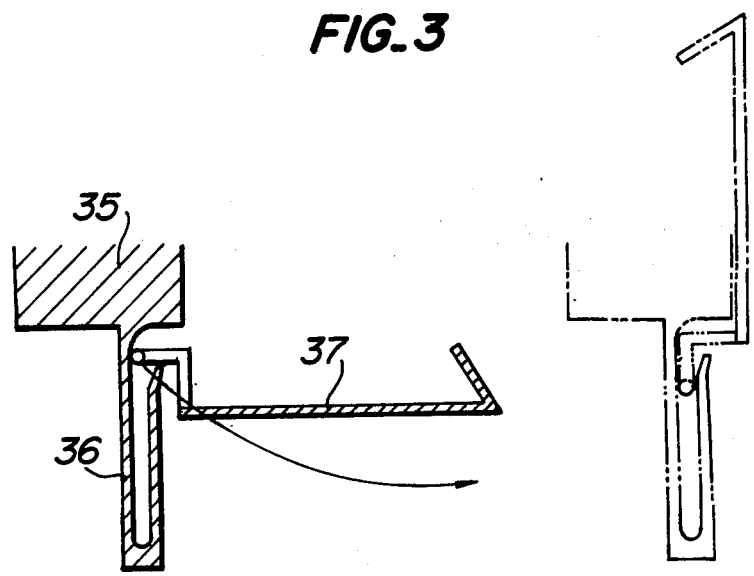
FIG_3

ELECTROPHOTOGRAPHIC APPARATUS

BACKGROUND OF THE INVENTION

Field of the Invention

The present invention relates to an electrophotographic apparatus, more particularly, an electrophotographic apparatus for exposing and scanning a document placed on a fixed copy board by a scanning optical system.

In a prior electrophotographic apparatus there is used a copy board moving system for exposing and scanning a document placed on a moving copy board and an optical system scanning method for exposing and scanning a document placed on a fixed copy board by a moving optical system. The electrophotographic apparatus adopting the former system has a small size and a low price. The electrophotographic apparatus adopting the latter system has a comparatively large size and a high price, but has good operation because of use of the fixed copy board and a possibility of high speed copying.

The document to be copied can be classified into the following groups, i.e., a book and a sheet-like document. The book is understood herein to be all kinds of literature and bound reports which have a certain thickness and the sheet-like document is understood to be a document for business use. The documents to be copied are almost all sheet-like documents rather than a book.

In order to efficiently copy the sheet-like document it is preferable to expose and scan the document while moving it by feed rollers. The type of the electrophotographic apparatus comprising such a mechanism, i.e., a sheet feed device, is almost non-existent, (a) the electrophotographic apparatus which can also copy the thick document such as a book becomes high priced if the sheet feed device exclusively for the sheet-like document is added to the apparatus, (b) it is impossible to provide the sheet feed device as it is to the electrophotographic apparatus adopting the optical system scanning method having the fixed copy board, (c) it is difficult to realize the sheet feed device required to feed the document with stability according to the paper quality of the sheet-like document which varies in wide range, (d) when a multiple copies are obtained from the same document, it is not efficient because the document must repeatedly be fed the required number of times by necessary numbers, (e) the electrophotographic apparatus comprising an automatic collating device can not fully provide the function of the sorter in connection with the case of the item (d).

The problems of items (d) and (e) can be resolved by using the electrophotographic apparatus having storage capability for information in the document, i.e., the electrophotographic apparatus which can obtain a plurality of copies based on an image-like modulated information formed by only one exposure.

An object of the present invention is to eliminate the above disadvantages of the conventional electrophotographic device.

Another object of the present invention is to provide an electrophotographic apparatus in which mechanisms capable of effectively copying a sheet-like document and capable of copying a thick document such as a book are provided to the electrophotographic apparatus adopting an optical system scanning method with a fixed copy board.

SUMMARY OF THE INVENTION

According to the present invention, an electrophotographic apparatus comprises a fixed copy board for exposing and scanning a document by a movable optical system, and a sheet feed device provided adjacent to the board for exposing a sheet-like document during conveying thereof, the movable optical system being fixed to a position corresponding to the sheet feed device when the sheet feed device is used, and the sheet feed device being mounted movably and being accommodated in the apparatus by moving the movable optical system to the position corresponding to the fixed copy board when the sheet feed device is not used. A pivot shaft for supporting one end of the sheet feed device is provided, the sheet feed device being supported at the position substantially equal to the level of the fixed copy board in the used state and being accommodated in the apparatus by pivoting the sheet feed device downwards in the nonused state. The movable or scanning optical system corresponding to the fixed copy board comprises a scanning mirror and an illuminating means, the scanning mirror and the illuminating means are movably arranged in a plane parallel to the fixed copy board, and the stop position of the scanning mirror and the illuminating means is determined in accordance with the accomodated nonused position or the used position of the sheet feed device. The apparatus further comprises a movable scanning body for integrally supporting the scanning mirror and the illuminating means, and a member integrally formed with the sheet feed device. The scanning body is set to be able to engage with the member at the stop position corresponding to the fixed copy board in the accommodated position of the sheet feed device and is set together with the engaged member at the position corresponding to the sheet feed device in the used position of the sheet feed device. The pivot shaft is provided at the position substantially equal to the level of the fixed copy board. A document supporting plate is pivoted to the pivot shaft or a shaft arranged near the pivot shaft, and the document plate is horizontally held when the sheet feed device is accommodated in the apparatus, and rotated and held at inclined position to set the sheet feed device in the used position when the sheet feed device is used. A great number of copies are obtained by once exposing and scanning the document placed on the fixed copy board or fed by the sheet feed device. An electrophotographic apparatus comprises a device for exposing and scanning a document placed on a fixed copy board by a movable optical system, and a sheet feed device provided near the fixed copy board for exposing a sheet-like document during conveying thereof, the optical system corresponding to both devices including a mirror opposite to the document which are separately provided in both devices, and other scanning mirrors and fixed lenses which are commonly provided in both devices whereby the mirror opposite the document in the scanning mirrors corresponding to the fixed copy board is only shifted from a light path thereof when the sheet feed device is used.

BRIEF DESCRIPTION OF THE DRAWING

FIG. 3 is a sectional view showing an engaged relation between a stopper and document guide and a stop member of a scanning body used in the sheet feed device shown in FIG. 2.

DESCRIPTION OF THE PREFERRED EMBODIMENTS

Figure 1:
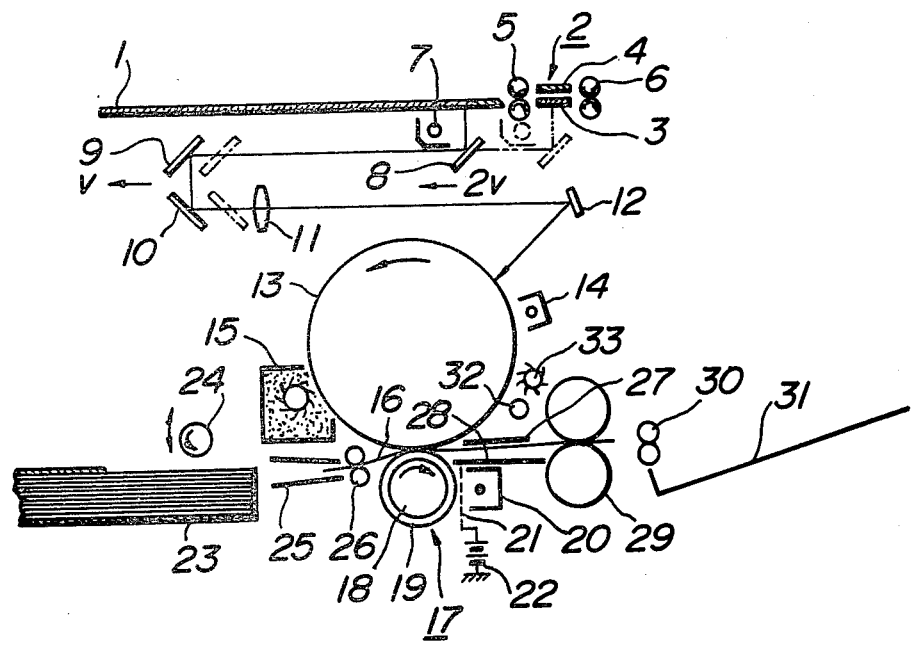
FIG. 1 is a diagram showing a construction of one embodiment of an electrophotographic apparatus according to the present invention.

Referring now to FIG. 1, one embodiment of an electrophotographic apparatus according to the present invention is shown. This embodiment shows a construction in which use is made of a photosensitive drum, an electrostatic latent image according to a document image is formed on the drum and a plurality of copies can be obtained based on the latent image. A sheet feed device 2 is arranged adjacent to a fixed copy board 1 consisting of a transparent glass plate. The sheet feed device 2 comprises two guide plates 3 and 4 which are opposite each other and separated taken a slight distance and pairs of feed rollers 5 and 6 which are arranged at opposite sides of the guide plates 3 and 4. A sheet-like document (not shown) is then inserted between the guide plates 3 and 4 by the feed rollers 5 and taken from the sheet feed device 2 by the feed rollers 6. It is preferable that the guide plate 3 is made transparent and the guide plate 4 is formed by a white material having high reflectivity. Alternatively, the guide plate 4 is formed from another material and the surface thereof opposite to the guide plate 3 is subjected to surface treatment by white material having high reflectivity.

An optical system comprising an illuminating lamp 7, scanning mirrors 8, 9, 10, a fixed lens 11 and a fixed mirror 12 is arranged under the fixed copy board 1. The illuminating lamp 7, the scanning mirrors 8, 9 and 10 in the optical system are movably arranged along the fixed copy board 1 so that they move in the direction of the arrow to expose and scan the document (not shown) placed on the fixed copy board 1. The exposure and the scanning are so effected that the moving amount of the illuminating lamp 7 and the scanning mirror 8 is twice that of the scanning mirrors 9 and 10 and the length of the light path from the surface of the document to be scanned to the lens 11 is made always constant.

In this embodiment a fixed optical system is constructed by shifting the illuminating lamp 7 and the scanning mirrors 8, 9 and 10 to the position shown by an imaginary line so that it is possible to expose and scan the document (not shown) fed by the sheet feed device 2.

The optical image of the document exposed and scanned by the above described optical system is projected on the surface of a photosensitive drum 13 which rotates in the direction of the arrow synchronized with the movement of the scanning optical system or the feed of the document by the sheet feed device 2. A corona charger 14 for effecting charges on the surface of the photosensitive drum 13 uniform is arranged before the optical image projecting position, viewed the rotating direction of the photosensitive drum 13. After being uniformly charged by the corona charger 14, the optical image is projected on the surface of the photosensitive drum 13 through the above described optical system resulting in a formation of the electrostatic image based on the optical image on the surface of the photosensitive drum 13. With a further rotation of the drum 13 the latent image is visualized by a developing device 15 to form a toner image and then the toner image is transferred to a recording paper 16.

As a transferring method of the toner image, there are: a method in which conductive rollers are arranged adjacent to the back of the recording paper and a voltage having reverse polarity to the charge of the toner is applied to the conductive roller, and a method in which a corona charger is arranged at the back of the recording paper and the corona charges having opposite polarity to that of the charge of the toner are applied to the back of the recording paper.

In the electrophotographic apparatus, use is made of a transferring roller 17 and the toner image made on the photosensitive drum 13 is transferred to the recording paper 16 without the storage characteristic of the latent image formed on the photosensitive drum 13, that is, the characteristic in which the latent image formed on the photosensitive drum 13 is almost changed over a long time so long as there is no effect from outside. For this purpose the transferring roller 17 consists of a dielectric layer 19 stacked on the periphery of a conductive roller 18, prior to transferring the transferring roller 17 is charged at a constant voltage by a corona charger 20 and the corona charges have migrated to the recording paper 16 conveyed between the transferring roller 17 and the photosensitive drum 13, a few parts having remained on the transferring roller 17 to form an electrostatic attractive force necessary to the transferring. In order to make charged voltage on the transferring roller 17 constant, a grid 21 is arranged between the transferring roller 17 and the corona charger 20 and a desired bias voltage is applied to the grid 21 from a bias supply 22 when the transferring roller 17 is charged by the corona charger 20. In order not to harm the latent image on the photosensitive drum 13 in case of transferring the toner image, the amounts of the charge and the surface voltage supplied to the transferring roller 17 are so set that the toner image transferred to the recording paper 16 has a density which is 50 to 80% of that of the toner image formed on the photosensitive drum 13. Such setting is realized by preferably selecting the material and the thickness of the dielectric layer 19 provided on the surface of the transferring roller 17 or by preferably selecting the value of the bias voltage applied to the grid 21.

The recording paper 16 is accomodated in a cassette 23, drawn out one by one synchronized with the rotation of the photosensitive drum 13 by a feed roller 24, conveyed between the photosensitive drum 13 and the transferring roller 17 through guide plates 25 and a pair of conveying rollers 26, and subjected to the transfer of the toner image. The recording paper 16 which has been subjected to the transfer of the toner image is peeled off from the photosensitive drum 13 by a peeling claw member 27, and conveyed through a guide plate 28 to a pair of fixing rollers 29 consisting of heat roller or pressure roller or a combination thereof, by which the recording paper 16 is fixed. The fixed paper 16 is taken out on a tray 31 through a pair of drawing rollers 30.

The latent image on the drum 13 and the residue toners after transfer are erased and cleaned by an erasing lamp 32 and a cleaning brush 33 which are arranged between the transferring roller 17 and the corona charger 14 and near the periphery of the drum 13 and thus assist the preparation of the next latent image.

In the above mentioned electrophotographic apparatus, accordingly, a great number of copies can be obtained from the latent image once formed on the drum 13 only by rotating the drum 13 and repeating only development and transferring without using a process in which the erasing lamp 32, the cleaning brush 33 and the corona charger 14 are effected each time one copy is obtained.

According to the electrophotographic apparatus shown in FIG. 1, a change of one mode of exposing and scanning a document with the use of the fixed copy board 1 and another mode of exposing and scanning a document with the use of the sheet feed device 2 can easily be realized only be extending the moving range of the movable or the scanning optical system. In this case the change of the sequence can be realized by the signal corresponding to the mechanical operation of the sheet feed device or by using a method of mechanically changing power transmission of the movable optical system along with a method of electrically controlling another portion such as the scanning of the optical system.

Figure 2:
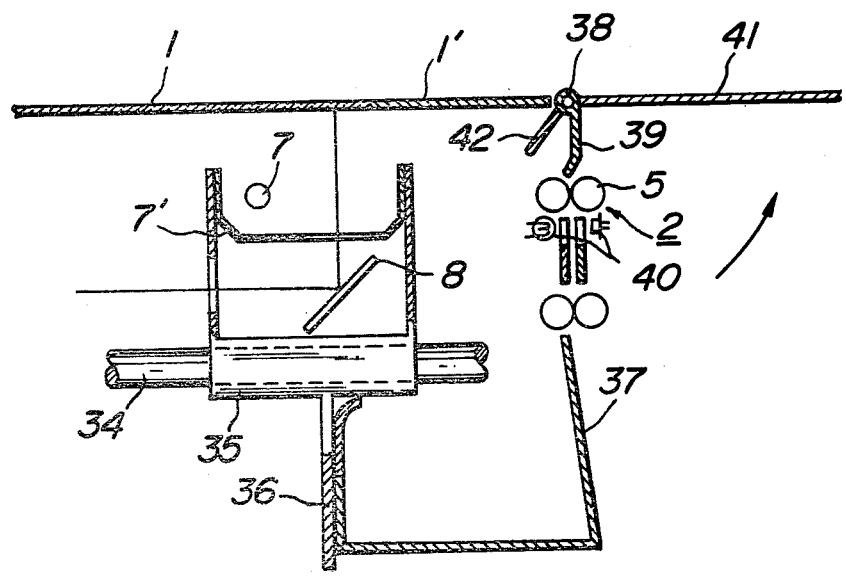
FIG. 2 is a diagram showing a construction of another embodiment of a sheet feed device used in the apparatus shown in FIG. 1.

In the electrophotographic apparatus according to the present invention shown in FIG. 1 it is preferable that the sheet feed device 2 is accomodated under the fixed copy board 1 when the sheet feed device 2 is not used. The accommodation of the sheet feed device 2 is realized by vertically moving the sheet feed device to accomodate it or by pivoting the sheet feed device 2. FIG. 2 shows one embodiment of the sheet feed device 2 in which the whole sheet feed device 2 is pivotable to accommodate it under the fixed copy board 1. FIG. 2 also shows the condition when the sheet feed device 2 is accommodated under the fixed copy board 1. As shown in FIG. 2 the illuminating lamp 7, an illuminating mirror 7' and the scanning mirror 8 are held integrally with a scanning body 35 which is slidably supported when a slide shaft 34. The scanning body 35 is also provided with a stop plate 36 so that the moving or the scanning range of the scanning body 35 is limited by engaging the stop plate 36 with a stopper and document guide 37 provided on the sheet feed device 2.

The sheet feed device 2 is supported by a pivot shaft 38 secured to a copy board holding frame 1' which supports the fixed copy board 1. The sheet feed device 2 comprises a document guide 39 pivoted to the pivot shaft 38 at its one end, feed rollers 5, 6, guide plates 3, 4 shown in FIG. 1, a document sensor 40 arranged at both sides of the guide plates 3, 4 for detecting presence of the document near the feed rollers 5, and the stopper and document guide 37 which are integrally constructed. The stopper and document guide 37 serves as a limitation of the moving range of the scanning body 35 as described above and functions as a tray for the document fed by the sheet feed device 2. The pivot shaft 38 is also provided with a pivoted document supporting plate 41 at the same plane as the level of the copy board supporting frame 1', and with a stopper 42 which is constructed integrally with the document supporting plate 41. The stopper 42 draws up the sheet feed device 2 at the same level with the fixed copy board and holds the document supporting plate 41 at a constant angle.

In the construction shown in FIG. 2 if the document supporting plate 41 is rotated in the counterclockwise direction, the stopper 42 is engaged to the document guide 39 to rotate the sheet feed device 2 in the counterclockwise direction. The rotation of the sheet feed device 2 is engaged to and stopped by a stopper (not shown) when the sheet feed device 2 has arrived at the same level as that of the copy board supporting frame 1'. With the rotation of the sheet feed device 2 the stopper and document guide 37 is separated from the stop plate 36 of the scanning body 35 and then the scanning body 35 can be moved to the lower side of the guide plate 3 when the stopper and document guide 37 is arrived at the predetermined position. The movement of the scanning body 35 is automatically realized by detecting the engaged condition of the stopper and document guide 37 and the stop plate 36 by a microswitch (not shown) or the like or realized by another mechanical construction. The scanning body 35 may be biased by a spring or the like to always move in the right direction in FIG. 2. Alternatively, the scanning body 35 may be moved by mechanically engaging the end of the stopper and document guide 37 and the stop plate 36 of the scanning body 35 with rotation of the sheet feed device as shown in FIG. 3.

As seen from FIG. 2 when the sheet feed device 2 is held at the same level as that of the copy board supporting frame 1', the document supporting plate 41 is held at a predetermined angle to the copy board supporting frame 1' so that insertion of the document in the sheet feed device 2 becomes very simple.

As described above, the electrophotographic apparatus according to the present invention comprises the fixed copy board 1 and the sheet feed device 2 arranged adjacent thereto for exposing and scanning the sheet-like document during its conveying; the optical system for scanning the area of the fixed copy board is made movable to the scanning position of the sheet feed device 2; in case of exposing and scanning the document on the fixed copy board 1 the optical system is moved and scanned; and in case of exposing and scanning the sheet-like document by the sheet feed device 2 the document is exposed and scanned during its conveying after the optical system is moved to the scanning position of the sheet feed device 2 and has held it in this position so that the sheet feed device can easily be accomodated in the electrophotographic apparatus because of simple construction as described above and thus the apparatus having low price can be obtained. The sheet feed device 2, as shown in FIG. 2, is put in the electrophotographic apparatus, i.e., under the level of the fixed copy board 1 when the sheet feed device 2 is not used, so that inconvenience in operation can be avoided its using the device. Alternately, the stop position of the scanning optical system can automatically be changed in relation to the putting in action and the taking-out action of the sheet feed device 2 and the scanning mechanism of the scanning optical system is locked in or made scannable in connection with the automatic change so that the sheet feed device 2 can conveniently be used.

The present invention can also be applied to the electrophotographic apparatus in which one copy is obtained by one exposure, but may advantageously be applied to the electrophotographic apparatus in which a great number of copies are obtained by one exposure since in the former the sheet-like document must be conveyed in the sheet feed device the same number of times as the required number of copies and in the latter the sheet-like document must be conveyed in the sheet feed device only one time even if a great number of copies are obtained from the same document.

When a great number of sheet-like documents are copied one by one, the copy can be obtained fast and easily by conveying the document in the sheet feed device rather than setting of the document on the fixed copy board so that the present invention may also be applied advantageously to the former electrophotographic apparatus.

It will be obvious that the present invention is not restricted to the embodiments described, but that many variations are possible to those skilled in the art without departing from the scope of the present invention. For example, an electrophotography having storage capability, i.e., an electrophotography capable of obtaining a great number of copies by one exposure may be replaced by an electrophotography using a photosensitive screen. The changing means and mechanism of the fixed copy board and the sheet feed device and the sequence thereof may also be replaced by another changing means, mechanism and sequence. The changing of the scanning optical system and the fixed optical system may also be realized by replacing a part of the optical system by another optical system instead of extending the moving or scanning distance of the scanning optical system. For example, another fixed mirror may be arranged at the mirror position shown by an imaginary line instead of the scanning mirror 8 shown in FIG. 1 and the scanning mirror 8 may be shifted from the light path by rotation or vertical movement of the mirror 8. The pivot shafts of the sheet feed device 2 and the document supporting plate 41 may also be arranged adjacent to each other or on same axis.

What is claimed is:

1. An electrophotographic apparatus comprising a fixed copy board for exposing and scanning a document by a movable optical system, and a sheet feed device provided adjacent to the board for exposing a sheet-like document during conveying thereof, the sheet feed device being made movable and being accommodated in the apparatus at the level substantially equal to that of the fixed copy board or under this level when the sheet feed device is not used; a pivot shaft at the position substantially equal to the level of the fixed copy board, said pivot shaft supporting one end of the sheet feed device to set the sheet feed device in one of two possible states; a movable or scanning optical system corresponding to the fixed copy board comprising a scanning mirror and illuminating means, said scanning mirror and said illuminating means being movably arranged in a plane parallel to the fixed copy board, the stop position of said scanning mirror and said illuminating means being determined in accordance with one of two possible positions of the sheet feed device; a scanning body for integrally supporting the scanning mirror and the illuminating means, and a member integrally formed with the sheet feed device and rotating with rotation of the sheet feed device, and when the sheet feed device is set at the accommodated position said member is engaged with the scanning body to set the scanning body at the position corresponding to the fixed copy board.

2. An electrophotographic apparatus comprising a fixed copy board for exposing and scanning a document by a movable optical system, and a sheet feed device provided adjacent to the board for exposing a sheet-like document during conveying thereof, the sheet feed device being made movable and being accommodated in the apparatus at the level substantially equal to that of the fixed copy board or under this level when the sheet feed device is not used; a pivot shaft at the position substantially equal to the level of the fixed copy board, said pivot shaft supporting one end of the sheet feed device to set the sheet feed device in one of two possible states; a document supporting plate pivoted to the pivot shaft, the document supporting plate being horizontally held when the sheet feed device is accommodated in the apparatus and rotated and being held at inclined position to set the sheet feed device in the used position when the sheet feed device is used.

3. An electrophotographic apparatus comprising a fixed copy board for exposing and scanning a document by a movable optical system, and a sheet feed device provided adjacent to the board for exposing a sheet-like document during conveying thereof, the sheet feed device being made movable and being accommodated in the apparatus at the level substantially equal to that of the fixed copy board or under this level when the sheet feed device is not used; a pivot shaft at the position substantially equal to the level of the fixed copy board, said pivot shaft supporting one end of the sheet feed device to set the sheet feed device in one of two possible states; a document supporting plate pivoted to a shaft arranged near the pivot shaft, the document supporting plate being horizontally held when the sheet feed device is accommodated in the apparatus and rotated and being held at inclined position to set the sheet feed device in the used position when the sheet feed device is used.

4. An electrophotographic apparatus comprising a fixed copy board for exposing and scanning a document by a movable optical system, and a sheet feed device adjacent to the board for exposing a sheet-like document during conveying thereof, the movable optical system being fixed to a position corresponding to the sheet feed device when the sheet feed device is used, the sheet feed device being mounted movably and being accommodated in the apparatus by moving and movable optical system to the position corresponding to the fixed copy board when the sheet feed device is not used.

5. An electrophotographic apparatus as claimed in claim 4, further comprising a pivot shaft for supporting one end of the sheet feed device, the sheet feed device being supported at the position substantially equal to the level of the fixed copy board in the used state and being accommodated in the apparatus by pivoting the sheet feed device downwards in the nonused state.

6. An electrophotographic apparatus as claimed in claim 5, wherein the movable or scanning optical system corresponding to the fixed copy board comprises a scanning mirror and an illuminating means, the scanning mirror and the illuminating means are movably arranged in a plane parallel to the fixed copy board, and the stop position of the scanning mirror and the illuminating means is determined in accordance with the accommodated position or the used position of the sheet feed device.

7. An electrophotographic apparatus as claimed in claim 6, including a movable scanning body for integrally supporting the scanning mirror and said illuminating means, and a member integrally formed with the sheet feed device, the scanning body being set to be able to engage with said member at the stop position corresponding to the fixed copy board in the accommodated position of the sheet feed device and being set together with the engaged member at the position corresponding to the sheet feed device in the used position of the sheet feed device.

8. An electrophotographic apparatus as claimed in claim 5 wherein the pivot shaft is provided at the position substantially equal to the level of the fixed copy board, a document supporting plate pivoted to the pivot shaft and held horizontally when the sheet feed device is accommodated in the apparatus and rotated and held at inclined position to set the sheet feed device in the used position when the sheet feed device is used.

9. An electrophotographic apparatus as claimed in claim 5 wherein the pivot shaft is provided at the postion substantially equal to the level of the fixed copy board, a document supporting plate pivoted to a shaft arranged near the pivot shaft and held horizontally when the sheet feed device is accommodated in the apparatus and rotated and held at inclined position to set the sheet feed device in the position when the sheet feed device is used.

* * * * *